March 8, 1960 G. W. JACKSON 2,927,801
HYDRAULICALLY ACTUATED TRIM HEIGHT CONTROL
Filed June 25, 1956 6 Sheets-Sheet 1

INVENTOR.
George W. Jackson
BY
HIS ATTORNEY

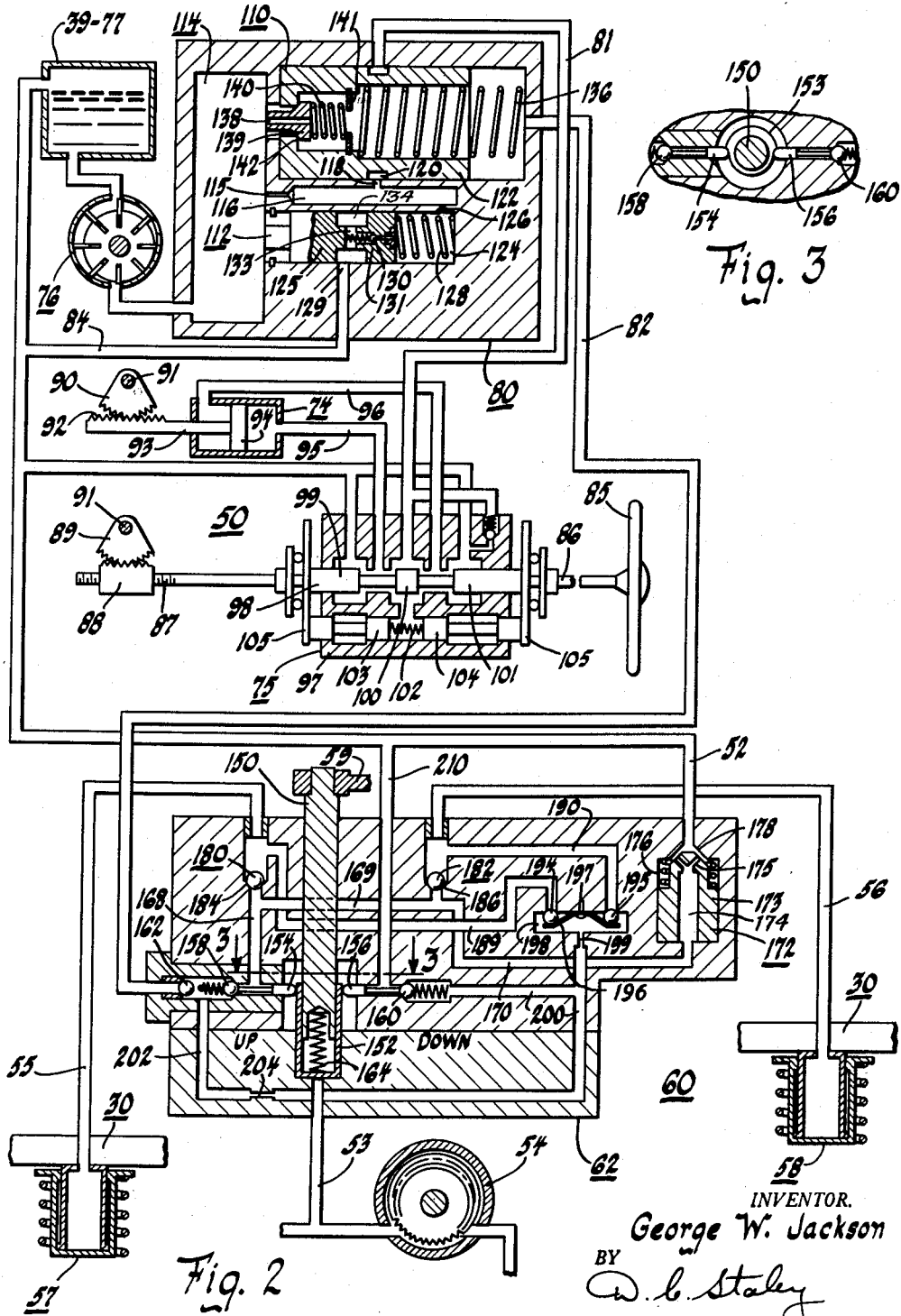

INVENTOR.
George W. Jackson
BY
HIS ATTORNEY

March 8, 1960 G. W. JACKSON 2,927,801
HYDRAULICALLY ACTUATED TRIM HEIGHT CONTROL
Filed June 25, 1956 6 Sheets-Sheet 4

INVENTOR.
George W. Jackson
BY
HIS ATTORNEY

March 8, 1960  G. W. JACKSON  2,927,801
HYDRAULICALLY ACTUATED TRIM HEIGHT CONTROL
Filed June 25, 1956  6 Sheets-Sheet 5

INVENTOR.
George W. Jackson
BY
*(signature)*
HIS ATTORNEY

INVENTOR.
George W. Jackson
BY
D. C. Staley
HIS ATTORNEY

United States Patent Office 2,927,801
Patented Mar. 8, 1960

2,927,801

HYDRAULICALLY ACTUATED TRIM HEIGHT CONTROL

George W. Jackson, Dayton, Ohio, assignor to General Motors Corporation, Detroit, Mich., a corporation of Delaware Application June 25, 1956, Serial No. 593,609

15 Claims. (Cl. 280—124)

This invention relates to a control system for supplying hydraulic fluid, and particularly to a hydraulic supply system for both a power steering mechanism and vehicle suspension means adjustable to maintain a predetermined clearance height between a sprung mass and an unsprung mass of a vehicle.

An object of the invention is to provide a hydraulic control system adapted for utilizing a power steering pump so that flow of hydraulic fluid to a power steering system can be cut off temporarily during a period when a predetermined clearance height is adjusted in a suspension means between a sprung mass and an unsprung mass of a vehicle.

Another object is to provide a single source of pressure connected with a control system adapted to normally operate with a first hydraulically-operable vehicle system and capable of being temporarily divorced therefrom to operate a second hydraulically-operable vehicle system which automatically re-establishes flow circuit relationship with the first system after providing a vehicle adjusting action during vehicle standstill.

Another object is to provide with a vehicle a hydraulic control system adapted to supply a power steering mechanism which is operable using a fluid from a power steering pump during vehicle motion and which is adapted to be capable of divorcing the power steering mechanism from the power steering pump temporarily at vehicle standstill to supply fluid to a vehicle suspension mechanism for maintaining clearance height between a sprung mass and an unsprung mass of the vehicle.

Another object is to provide a vehicle hydraulic control system adapted to supply a power steering mechanism which is operable using a fluid from a power steering fluid source during vehicle motion and is adapted to be capable of cutting off the power steering mechanism from the power steering source temporarily at vehicle standstill to supply a suspension mechanism for maintaining a predetermined clearance height between a sprung mass and an unsprung mass of the vehicle using separate flow control valves for the steering and suspension mechanisms, respectively, and a control means sensitive to fluid flow connected between the valves to channel fluid through conduits temporarily supplying operating fluid to the suspension mechanism from the source.

Another object is to provide a vehicle with a hydraulic control system adapted to supply a power steering mechanism using a fluid from a power steering source during vehicle motion and adapted to be capable of cutting off the power steering mechanism from the power steering source temporarily during vehicle standstill to supply fluid to a vehicle suspension mechanism for maintaining a predetermined clearance height between a sprung mass and an unsprung mass of the vehicle using separate flow control valves for the steering and suspension mechanisms respectively, together with fluid flow sensitive control means operatively associated with each of these valves to temporarily supply operating fluid to the suspension mechanism from the source utilizing restricted passages and chambers in the system to initiate fluid supply to the suspension mechanism, to permit reconnection of the power steering with the source of the system, and to interconnect valving of the suspension valve means to prevent interflow between separate fluid expansible springs of the suspension mechanism.

Further objects and advantages of the present invention will be apparent from the following description, reference being had to the accompanying drawings, wherein a preferred embodiment of the present invention is clearly shown.

In the drawings:

Fig. 2 is a schematic and diagrammatic representation of the hydraulic control system in Fig. 1.

Fig. 3 is a fragmentary cross-sectional view taken along line 3—3 of Fig. 2.

Figure 1:
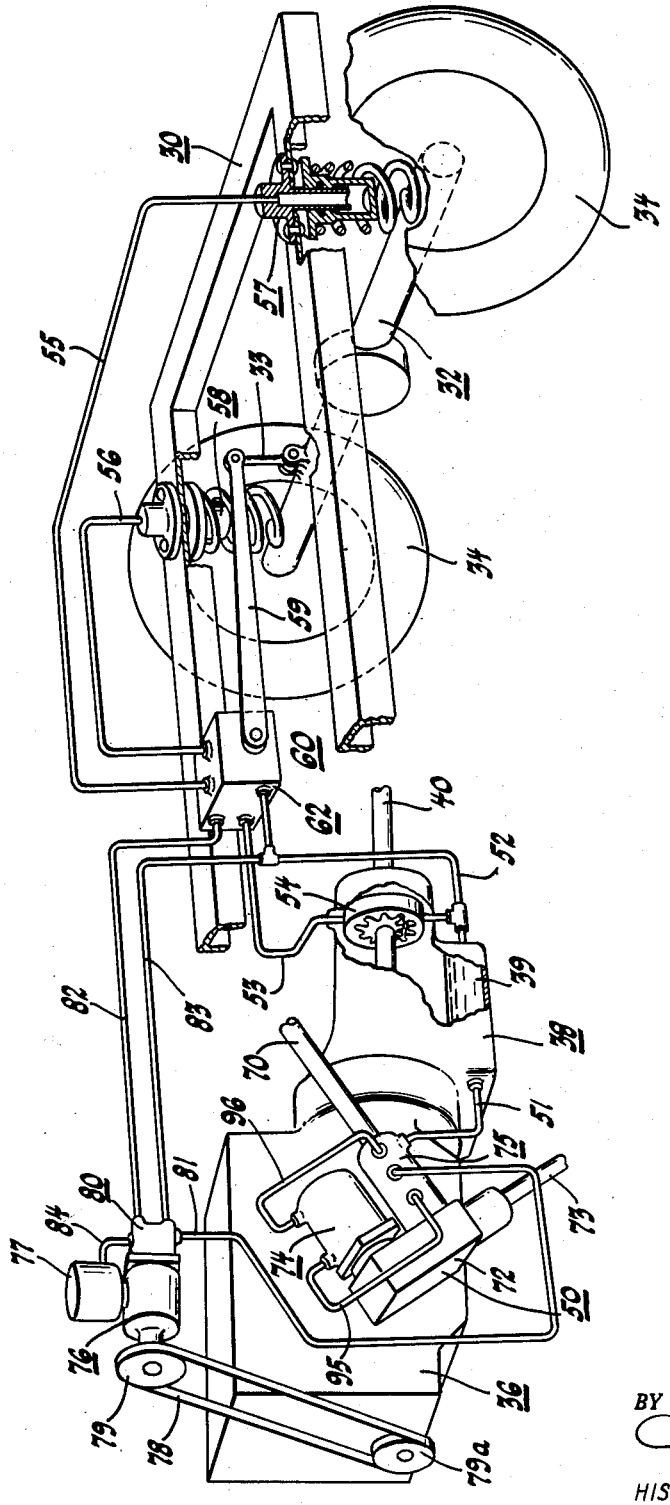
Fig. 1 is a schematic illustration of a portion of a motor vehicle including power steering mechanism and a suspension mechanism operably connected with a hydraulic control system of the present invention.

With particular reference to Fig. 1, the present invention is illustrated with a portion of a vehicle, including a sprung mass vehicle body, or frame, generally indicated by the numeral 30, and an unsprung mass, axle, or running gear, generally indicated by the numeral 32, having a vertical rod or member 33 rigidly attached thereto. Wheels, generally indicated by the numeral 34, are rotatably attached to the running gear in a conventional manner. The vehicle is provided with a motor, generally indicated by the numeral 36, to which a hydrokinetic torque transfer mechanism or torque converter type automatic transmission, generally indicated by the numeral 38, is connected in operative relationship. A torque tube or power shaft, generally indicated by the numeral 40, transmits rotative forces from the engine 36 and transmission to a connection (not shown) capable of rotating the wheels 34 to cause forward or rearward motion of the vehicle. The transmission 38 is connected by multiple conduits to a power steering mechanism, generally indicated by the numeral 50, and to a suspension mechanism, generally indicated by the numeral 60.

A conduit 51 connects a sump or reservoir portion 39 of the transmission 38 with the power steering mechanism 50 so that a common type of fluid is used throughout the hydraulic system of the present invention. A conduit 52 connects a control valve means 62 of the suspension mechanism 60 with the sump of the automatic transmission and a conduit 53 connects a rear pump 54 of the transmission with the control valve means 62 for a purpose to be described below in further detail. Conduits 55 and 56 connect the valve means 62 to a pair of fluid expansible springs 57 and 58, respectively. These fluid expansible springs provide support and resilient action between the unsprung mass 32 and sprung mass 30 and maintain a predetermined clearance height therebetween as will be explained below. An actuating arm 59 is pivotally connected between the valve 62 of the suspension mechanism and the vertical rod 33 on the unsprung mass 32. This pivotable arm 59 actuates valving mechanism within the valve means 62 in response to changes of clearance height between the unsprung and sprung masses. The valve means 62 is mounted on the sprung mass 30. Depending upon actuation of valving mechanism within the control valve means 62 by means of arm 59, fluid is supplied or exhausted to the springs 57 and 58 to maintain a predetermined clearance height between the sprung and unsprung masses of the vehicle.

The schematic representation of Fig. 1 also shows a portion of a steering column 70 through which a steering-wheel-connected shaft extends to a gear box 72 operable to effect steering control of the vehicle through a shaft connection 73 suitably connected to a steering linkage with front wheels of the vehicle not shown. It is to be understood that springs may be provided with the front wheels similar to springs 57 and 58 with the rear wheels. An operably connected power steering piston and cylinder, generally indicated by the numeral 74 receiving fluid under control of a valve, generally indicated by the numeral 75, assist the steering mechanism in moving gearing contained within the gear box 72.

The conventional power steering mechanism provided with the present invention includes a power steering fluid source or pump, generally indicated by the numeral 76 having a power steering reservoir 77 therewith. This pump is driven by a connection with the motor 36 in a usual manner, such as by means of a motor crank-shaft-driven pulley 79A connected by a drive belt 78 to a pulley 79 with the pump 76.

In accordance with the present invention, a control means or mechanism, generally indicated by the numeral 80, is attached to one side of the pump 76. A conduit or pressure line 81 connects this control means with the power steering control valve means 75. Another conduit or pressure line 82 connectable to receive fluid under pressure from the pump 76 for supply to the suspension mechanism control valve means 62 is connected therebetween as shown. Conduits 81 and 82 thus supply fluid under pressure to the power steering mechanism and suspension mechanism depending upon the setting or positioning of mechanism within the control means 80. A conduit 83 and return line 84 connect the power steering pump 76 and reservoir 77 as well as control means 80 with conduit 52 leading to the reservoir 39 in the automatic transmission 38.

Fig. 2 diagrammatically illustrates the basic valves and controls mentioned with the power steering mechanism and suspension mechanism on the vehicle in Fig. 1. Specifically, the parts similar to those described with Fig. 1 are indicated having the same identifying numerals in Fig. 2. Fig. 2 shows considerable further detail of structure with the power steering mechanism 50 and suspension mechanism 60, particularly in the mechanism control valve means 62 and power steering control valve means 75. The control means 80 determining supply of fluid pressure from pump 76 is also clearly shown.

A steering wheel 85 is shown in Fig. 2 connected to a shaft 86 at one end with a worm 87 provided on the other end cooperable with a ball nut 88 having teeth which mesh with one of a pair of pitman shaft gear sectors 89 and 90 disposed on a pitman shaft 91 of the steering mechanism. The gear sector 90 meshes with a rack 92 attached by a shaft 93 to a piston 94 reciprocable within the power cylinder 74 of the power steering mechanism. The piston 94 is movable in response to fluid pressure supplied through conduits 95 and 96 connected with the power steering valve 75 as illustrated in Figs. 1 and 2.

The power steering control valve means 75 as shown in Fig. 2 is positioned for fluid circulation without power application. The power steering valve includes a body portion 97 provided with central chambers in a conventional manner and a cooperable spool 98 movable in response to turning movement from the steering wheel 85 effected on worm 87 to shift lands 99, 100 and 101 to the left or to the right so as to channel fluid supplied under pressure through the power steering pressure line 81 to either the conduit 95 or 96 for applying power and force to the piston 94 to assist in turning the front wheels of the vehicle through gearing 89—90 using the pitman shaft 91 in a conventional manner. A spring 102 cooperable with plungers 103 and 104 abutting thrust bearings 105 on shaft 86 provides self-centering force on the spool 98. The power steering pump 76 for supplying fluid pressure is connectable to the power steering control valve 75 through the control means 80.

The control means 80 includes a flow sensitive valve, generally indicated by the numeral 110, and a conventional power steering flow control and blow-off valve, generally indicated by the numeral 112. The pump 76 is connected by a suitable conduit to a pump discharge chamber, generally indicated by the numeral 114, provided with the control means 80. A restriction or restricted opening 115 is placed between the pump discharge chamber and a passage chamber 116. The flow of fluid to the power steering valve 75 passes from chamber 116 through a flow passage 118 and enters an annular chamber 120 formed with a spool 122 of the flow sensitive valve 110. As long as the flow sensitive valve 110 is positioned as shown in Fig. 2, fluid passes by way of the annular chamber 120 to the conduit or pressure line 81 to the power steering valve 75.

A chamber 124 is provided at one side of a spool 125 of the power steering flow control and blow off valve 112. The chamber 124 is connected with passage chamber 116 through a restriction or narrow passage 126. Pressure drop across the restriction 115 causes chamber 116 to be at a lower pressure than the pump discharge chamber 114, and, as a result, chamber 124 is at the pressure of chamber 116 so that the spool 125 of valve 112 moves in a rightward direction against a spring 128 to allow excess fluid discharged by the pump 76 to bypass through an opening 129 to the conduit 84 returning to the reservoir. Excess fluid discharge from pump 76 exerts force from chamber 114 directly against the spool 125 at the end opposite spring 128 and chamber 124 for effecting the bypass flow.

When all flow stops in the power steering system and pressure rises abnormally high, a ball check valve 130 in spool 125 rises from its seat 131 to allow fluid under pressure transmitted to the chamber 124 to exhaust through a passage 133 into an annular recess 134 connectable to the opening 129 returning to the reservoir. This action permits the valve 112 to move to the right and exhaust the excess discharge from the pump 76 to the reservoir opening 129 and passage 84. It is to be understood that the foregoing operation is conventional with a power steering flow control and blow off valve often used in power steering mechanisms.

The present invention adds to the control means 80 containing the valve 112 by providing the flow sensitive valve 110 which remains in the left hand position shown in the diagram of Fig. 2 as long as fluid is not in motion in the suspension mechanism for adjusting and maintaining a predetermined clearance height between the unsprung mass 32 and sprung mass 30 of Fig. 1. The spool 122 of flow sensitive valve 110 is urged by a spring 136 to the left hand position shown. A small passage 138 through which fluid from the pump discharge chamber 114 passes to the supply line 82 of the suspension mechanism is provided in a valve element 139 biased to a seating position against one end of the spool 122 through a spring 140 engaged by a washer 141 as shown. The valve element 139 provides a damping action for fluid flow through the passage 138 with greater fluid flow being permitted, depending upon suspension mechanism requirements by unseating of the element 139 from the seat 142 of the valve spool 122.

Fluid flow in the flow sensitive control valve means 110 depends upon actuation of the valving mechanism including a second flow sensitive valve in suspension mechanism control valve means 62. The actuating arm 59 described in Fig. 1 is connected rigidly to a shaft 150 rotatably disposed in the suspension mechanism valve means 62 as shown in Fig. 2. Arm 59 indicates vertical height between sprung mass 30 and unsprung mass 32 through connection to rod 33 which is rigidly attached to arm 59 and pivotable relative to axle 32 or pivotally attached to arm 59 with rigid connection to axle 30. The arm 59 rotates the shaft 150 thereby turning a cam member 152 into engagement with a pair of plungers 154 and 156. The plunger 154 is movable to unseat a ball valve element 158 whereas the plunger 156 is capable of unseating a ball valve element 160. A check valve 162 is provided at the point where conduit 82 enters the suspension mechanism valve means 62 so that fluid can enter to flow in only one direction and not flow in reverse through the conduit 82.

The cam member 152 provides a cam surface 153 shown in the view of Fig. 3. The cam surface 153 is engageable with the plungers 154 and 156 only so long as the cam member 152 is positioned as shown in Fig. 2. Because it would be undesirable to have the power steering mechanism deprived of fluid pressure for assisting steering of a moving vehicle, the present invention provides a conduit 53 connected between the valve means 62 and a rear pump 54 of an automatic transmission to prevent engagement of the cam surface 153 with plungers 154 and 156 during vehicle movement. The rear transmission pump 54 operates to supply fluid under pressure to conduit 53 only when the vehicle is in motion and serves to axially shift the cam member 152 along the axis of shaft 150 against the bias of a spring 164 to dislocate the cam surface 153 from possible engagement with plungers 154 and 156. Only when the vehicle is not moving or is at standstill will the cam member 152 be positioned as shown in Figs. 2 and 3 with cam surface 153 engageable with plungers 154 and 156. It is to be understood that solenoid operated means responsive to vehicle movement could also be used to axially shift the cam member 152 over shaft 150.

Assuming the vehicle to be in a standstill position with the motor 36 running so as to drive the pump 76, the valve elements 158 or 160 will be unseated in response to a change from a predetermined clearance height to be maintained between the sprung and unsprung masses of the vehicle. As the arm 59 is moved causing rotating action of the shaft 150, a key or straight splined connection between the shaft and member 152 causes rotative movement to be imparted to the cam portion 153. The valve element 158 as provided in the valve means 62 is responsive to rotative movement indicating a requirement for additional fluid to be supplied to the springs 57 and 58 and thus may be referred to as the "up" control. Similarly the valve element 160 can be called a "down" control because it is responsive to rotative movement indicating excessive clearance height between the sprung and unsprung masses as maintained by the springs 57 and 58 so that a drain or exhaust condition will be effected causing downward movement of the sprung mass relative to the unsprung mass. It is to be understood that the straight splined or keyed connection (not shown in Fig. 2) between the cam member 152 and shaft 150 is designed to permit axial shifting movement between these members in response to fluid pressure supplied through conduit 53 from the rear transmission pump 54.

When the valve 158 opens as actuated by the arm 59 indicating that the sprung mass of the vehicle has dropped below a predetermined trim height relative to the unsprung mass, hydraulic fluid will flow through the opening 138 in the flow sensitive valve 114. The check valve 162, as well as the valve element 158 are unseated and a conduit 168—169—170 connects fluid flow to a flow sensitive valve or second control means operative in response to fluid flow, generally indicated by the numeral 172. This second flow sensitive valve 172 is operatively associated with the suspension mechanism valve means 62 as distinguished from the first flow sensitive valve 114 operatively associated with the control valve means 80. The second flow sensitive valve 172 is provided with a spool 173 having a central longitudinally extending passage 174 connected for fluid flow through ports 175 initially permitting fluid flow through conduit 52 returning to the reservoir. The spool 173 is biased to a position shown in Fig. 2 by a spring 176. The initial pilot flow of fluid through the second flow sensitive valve 172 to conduit 52 shifts the first flow sensitive valve 110 from the lefthand position shown in Fig. 2 to a righthand position to shut off the power steering flow conduit 81 and to provide for full pump discharge from the power steering pump 76 through the passage 138 and ultimately about element 139 from chamber 114 into the conduit 82 when the flow through the passage 138 reaches a predetermined value. This value may be at the rate of from ⅓ to ½ gal. per minute flow through the passage, for example, depending upon the inherent force provided in the springs 136 and 140 biasing the first flow sensitive valve 110 to a left hand position illustrated in Fig. 2.

After a brief initial flow of sufficient duration to permit shifting of the first flow sensitive valve 110 as just described, the second flow sensitive valve 172 also shifts from the position illustrated in Fig. 2 against the bias of the spring 176 so as to close the ports 175 against a conical seat 178 thereby shutting off the pilot flow through the second flow sensitive valve 172. The pilot flow through the second flow sensitive valve 172 is shut off at a flow rate slightly higher than that effective to shift the first flow sensitive valve 110 as described and may occur at a value such as 6/10 to 8/10 gal. per minute, for example.

The purpose of the second flow sensitive valve 172 is to provide for an initial hydraulic fluid flow through the first flow sensitive valve 110 to shift the first flow sensitive valve spool 122 to a position cutting off the power steering conduit 81 from fluid supply at the time when fluid is to be supplied to the springs 57 and 58 for adjusting the trim height or vertical clearance between the unsprung and sprung masses of the vehicle. This functioning of the flow sensitive valve means divorces the trim height control or suspension mechanism from the power steering mechanism during the time when adjustment in the clearance height between the sprung and unsprung masses is being made.

As soon as the second flow sensitive valve 172 closes, the full fluid pressure from the pump 76 is delivered through the line 82 and the valve element 158 to conduits 168 and 169 causing opening or unseating of check valves 180 and 182 connected in passages with springs 57 and 58, respectively. It is to be understood that conduits similar to 55 and 56 connected with springs 57 and 58, respectively, may be provided for maintaining clearance height between sprung and unsprung masses of the vehicle both for the rear and forward running gear of the vehicle. This means that valves similar to check valves 180 and 182 may be provided for adjusting clearance height in the front or back of a vehicle. It is also to be understood that a source of fluid pressure or a pump separate from the power steering pump 76 could be provided to furnish fluid pressure for a first control mechanism such as a power steering mechanism, and also a second control mechanism such as the suspension mechanism as well as any other fluid actuated and controlled hydraulic mechanisms which may be provided with a motor vehicle. It is also to be noted that a control arm separate from the control arm 59 effecting positioning of a valve mechanism similar to that disposed within valve means 62 may be provided for the rear and forward portions of the sprung and unsprung masses of a motor vehicle.

In the illustrated valve means 62 operably connected with the source of fluid pressure and springs 57 and 58 for the rear end of the motor vehicle, the valves 180 and 182 prevent escape of fluid from the springs 57 and 58 by seating action of balls against the shoulders 184 and 186, respectively. As long as the arm 59 remains in a position representing the predetermined clearance height between the sprung and unsprung masses, the cam portion 153 is in a neutral position as illustrated in Fig. 3 relative to the plungers 154 and 156. In this neutral position the conduits 55 and 56 are connected by conduits 189 and 190, respectively, with valves 194 and 195 normally biased to a closed position by a double-arm spring member 196 suitably attached as by a rivet or screw 197 to the valve means 62. The valves 194 and 195 are located in a chamber 198 connected by a restrictive means or restriction in a passage 199 to a chamber portion 200 formed in communication with the "down" valve 160. The chamber 200 is also connected by a conduit or passage 202 through a second restriction 204 to the one side of valve element 158 of the "up" control mechanism.

The restriction 199 is placed in the conduit between valves 194 and 195 and the "down" valve 160 so that the chamber 200 will be at reservoir pressure when the "down" valve 160 is opened to exhaust fluid from the springs 57 and 58. Fluid is exhausted from the springs 57 and 58 only when the rod or arm 59 has turned the cam member 152 so that cam portion 153 thereon engages plunger 156 displacing valve element 160 from its seat. With the restriction 199, if for any reason valves 180 and 182 or valve element 158 have leaked to cause a rise in pressure in the conduit lines between these valves so as to transmit an increased pressure to the second flow responsive valve 172 or flow sensitive control means associated with the suspension mechanism, the opening of the "down" valve 160 renders the chamber 200 at exhaust pressure providing for release of pressure in the conduit system containing valves 180, 182 and 158. This release of pressure allows the second flow sensitive valve 172 to be reset in its position shown in Fig. 2 biased by spring 176 to open the ports 175 from the valve seat 178. This release of pressure, shifting the second flow sensitive valve 172 as mentioned, resets the control system of the present invention so that the next time the "up" valve 158 is opened, the second flow sensitive valve 172 is in a position to permit initial fluid flow therethrough, so that the first flow sensitive valve 110 can once more render the system operative to close off the fluid supply conduit 81 to the power steering control valve 50.

The restriction 204 is placed in the conduit lines between the "up" valve 158 and the "down" valve 160 so that when the "down" valve 160 opens to permit exhaust of hydraulic fluid from the spring cylinders, there will not be sufficient flow from the pump 76 through the port 138 as to effect an actuation or shifting of the first flow sensitive valve 110 during lowering of the clearance height between the sprung and unsprung masses.

As soon as the sprung mass of the vehicle is brought to the predetermined clearance height relative to the unsprung mass by addition to fluid to the springs 57 and 58, the arm 59 effects rotation of the shaft 150 causing the cam portion 153 to disengage the plunger 154 permitting reseating and closing of the "up" valve 158 thus stopping the flow of fluid in the supply conduit 82 to the suspension mechanism. As soon as flow stops in the conduit 82, the first flow sensitive valve 110 is shifted to the left as shown in the diagram of Fig. 2 by the force of springs 136 and 140 to reconnect the power steering pump 76 with the power steering control valve 75 through the annular recess 120 around the spool 122 of the first flow sensitive valve 110. It is understood that the "down" valve 160 is opened by the plunger 156 by the cam portion 153 when fluid must be exhausted from the springs 57 and 58 to decrease the clearance height between the sprung and unsprung masses of the vehicle. Fluid must be exhausted from the springs 57 and 58 when load is decreased in the vehicle and the sprung mass tends to ride too high relative to the unsprung mass. Exhaust flow from the springs 57 and 58 passes through the conduits 55 and 56, respectively through the valves 194 and 195 back to the reservoir through an exhaust line 210 until the sprung mass drops to the proper clearance height at which the valve 160 is closed. Due to the connection with the transmission outlined above, a change in clearance height between the sprung and unsprung mass can occur only when the car is standing still with the rear transmission pump 54 delivering no fluid to cause shifting of the cam member 152 as described.

It is to be noted that the conduits interconnecting valves 180, 182, 194 and 195 are arranged to prevent interflow of hydraulic fluid between the spring 57 on one side of the vehicle and the spring 58 on the other side of the vehicle. The check valve 162 retains fluid within the valve means 62 maintaining the predetermined clearance height with the springs 57 and 58 using the various conduits by preventing escape of fluid therefrom.

The schematic and diagrammatic representations of Figs. 1, 2 and 3 together with the foregoing description disclose the basic features of the applicant's invention using a single pump for supplying a first and second hydraulically operated mechanism in conjunction with flow sensitive control means determining which hydraulically operable mechanism will be supplied with fluid. However, Figs. 4 through 15 illustrate various valve and mechanical components of the suspension mechanism as well as the control means to which the power steering mechanism is connected to be temporarily cut off in response to a predetermined rate of fluid flow through a first flow sensitive valve 110 in the present invention.

Figure 5:
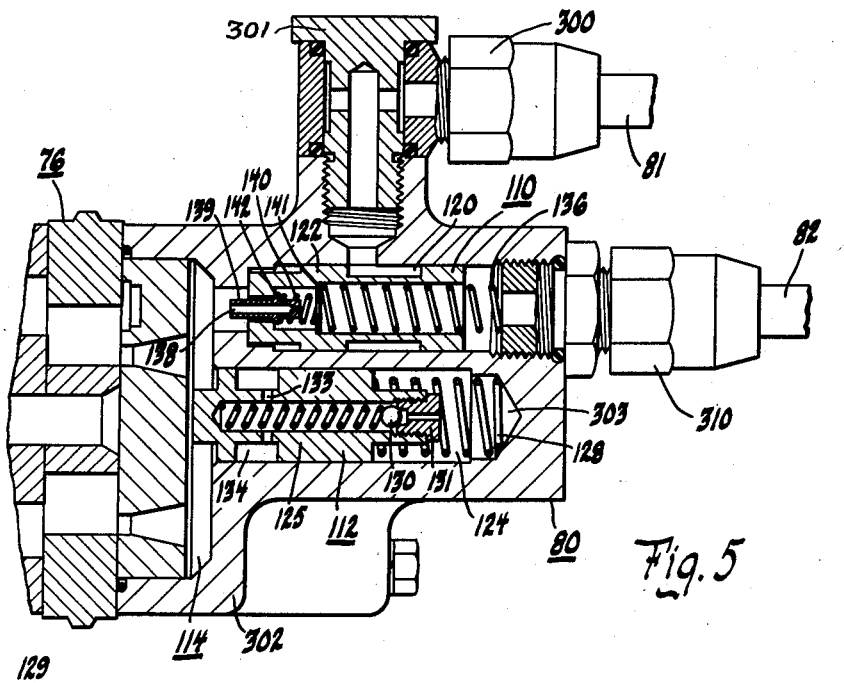
Fig. 5 is a fragmentary cross-sectional view taken along line 5—5 of the valve means in Fig. 4.
Figure 6:
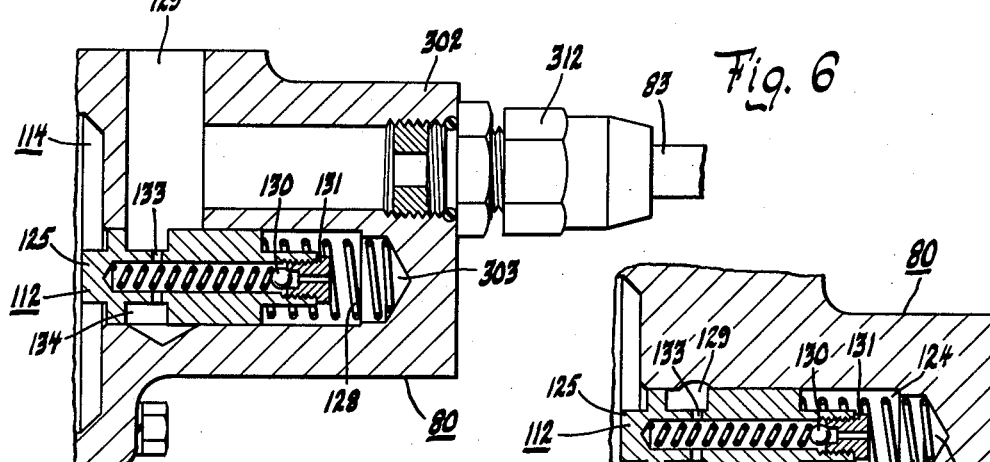
Fig. 6 is a cross-sectional view taken along line 6—6 of Fig. 4.
Figure 4:
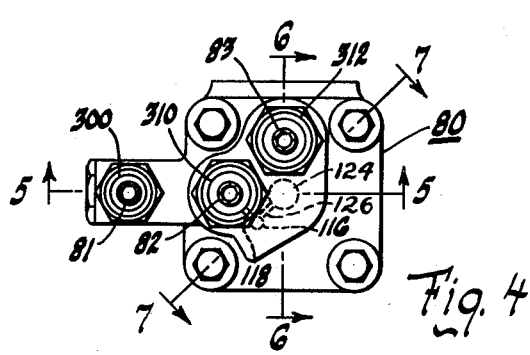
Fig. 4 is an end view of a valve means associated with the power steering mechanism in the present invention shown diagrammatically in Fig. 2.

Fig. 4 illustrates an end view of structure provided with the control valve means 80 shown in Figs. 1 and 2 including a fitting 300 to which the conduit 81 communicating with the power steering mechanism is attached. The fitting ties in with a passage forming means or plug 301 shown in a cross-sectional view of Fig. 5 which communicates with the annular space or chamber 120 of the spool 122 of the first flow sensitive valve, generally indicated by the numeral 110. The parts of this valve 110 as shown in Fig. 5 are identified with identical numbering used in Fig. 2. Fig. 5 shows a direct connection of the valve means 80 adjacent the pump 76 so that the pump discharge chamber 114 receives fluid under pressure directly from the pump 76. It is to be noted that the control means 80 include a body portion 302 provided with a recess 303 within which the spool 125 of the conventional power steering flow control and blow off valve 112 is movable. The body 302 is provided with the reservoir passage 129 shown in Fig. 6.

as mentioned with Fig. 2 connectable with the annular recess 134 associated with the valve 112. Fig. 4 illustrates the interconnection of the chamber 116 through the passage 118 represented by dotted lines as shown with the first flow sensitive control valve 110. Thus chamber 116 is connected with the annular chamber 120 formed with flow sensitive valve 110 by a direct connection as indicated in the schematic representation of Fig. 2.

Figure 7:
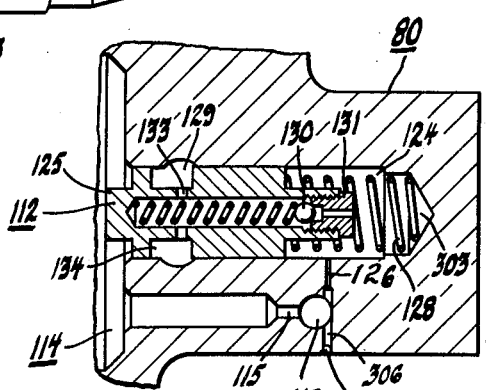
Fig. 7 is a cross-sectional view taken along line 7—7 of Fig. 4.

The restricted passage 126 for connecting the chamber 124 with the chamber 116 in the conventional power steering flow control valve 112 of Fig. 2 also can be clearly seen in Fig. 7. The passage is formed through a drilled opening 306 which is closed by a ball 308 as shown.

Fig. 5 also shows a fitting 310 providing an opening communicating between the conduit 82 connected with the suspension mechanism as described in Fig. 2 and the passage 138 in the flow sensitive valve 110. In addition to the connection with conduits 81 and 82, the valve body 302 provides a fitting 312 connected with a conduit 83 as represented in Fig. 1 connectable to the reservoir 39 with the automatic transmission 38. This connection ties in with the passage 129 providing a bypass for excess pressure from the pump 76 through the conventional power steering flow control valve 125 as described above to the power steering reservoir 77.

Figures 8, 9:
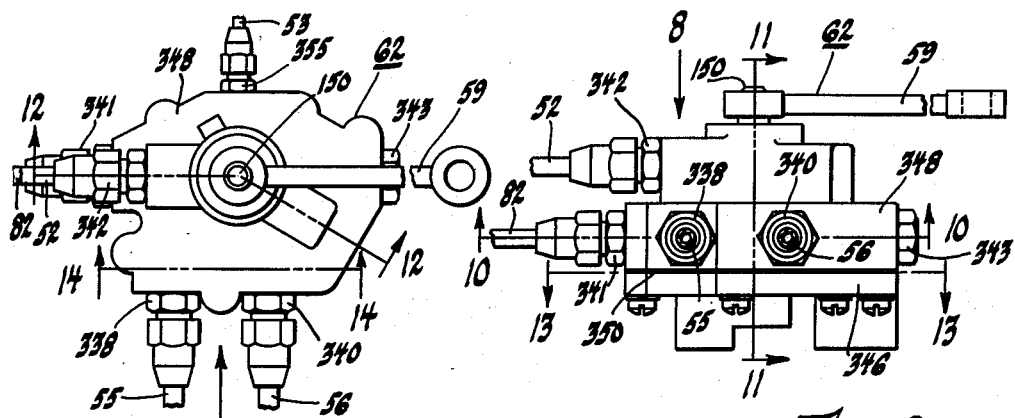
Fig. 8 is a side view of a valve means associated with the suspension mechanism of the present invention shown diagrammatically and schematically in Figs. 2 and 3.
Fig. 9 is an end view of the suspension mechanism valve means of Fig. 8, with the arrow marked 8 showing the view sene in Fig. 8, and, similarly, the arrow marked 9 on Fig. 8 showing the view of Fig. 9.
Figure 10:
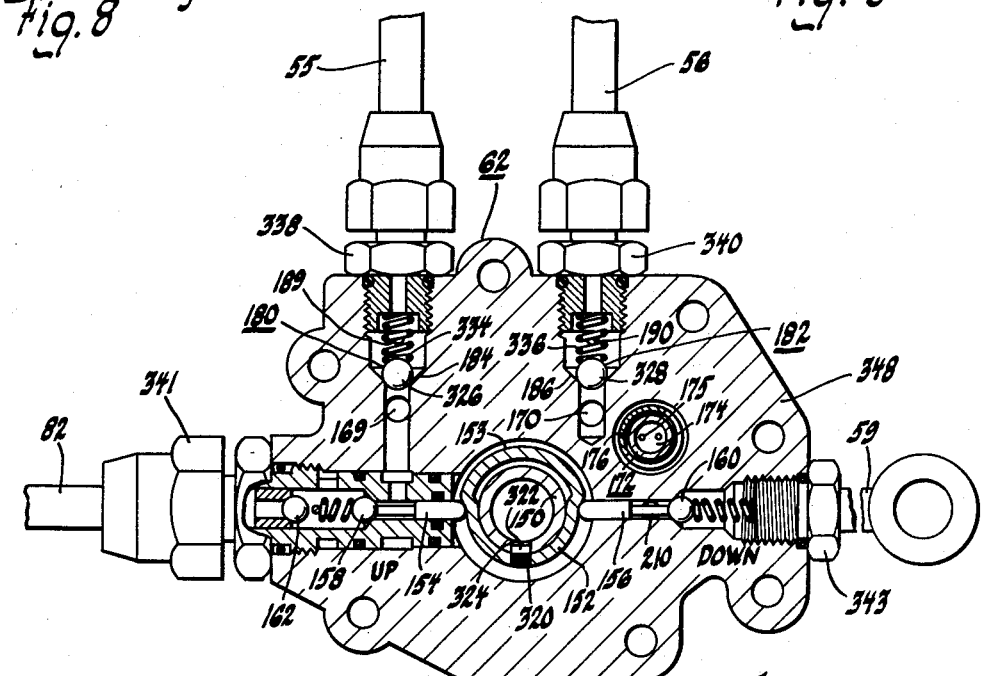
Fig. 10 is a partially sectioned view taken along line 10—10 of Fig. 9.

Figs. 8 and 9 are side and end views, respectively, of the valve means 62 in Figs. 1 and 2 operatively associated with the suspension mechanism 60 and fluid springs 57 and 58 as described with Fig. 2. The actuating arm 59 is shown in both Figs. 8 and 9 connected to the shaft 150. The cross-sectional view of Fig. 10 shows fastening means such as a set screw 320 interconnecting the shaft 150 with the cam member or actuator 152. This set screw is knurled at one end and formed with a smooth surface 322 at the other side permitting shifting movement of the cam member 152 with cam surface 153 axially along a slot 324 formed with the shaft 150. This axial shifting movement is necessary so that the transmission pump 54 of Figs. 1 and 2 can cause disengagement of the cam portion 153 from the plungers 154 and 156 as described with the diagram of Fig. 2. Check valves 180 and 182 are shown including balls 326 and 328, respectively, fitted against shoulders 184 and 186, respectively, by spring means 334 and 336. The spring means 334 and 336 are fitted between the balls 326 and 328 by fittings 338 and 340, respectively. Conduits 55 and 56 are attached to these fittings as shown. A fitting 341 connects supply conduit 82 to the check valve 162 and "up" control valve 158. A fitting 342 in Figs. 8 and 9 connects exhaust line 52 to the body 348 with the proper passage as outlined in Fig. 2. A plug 343 closes off the opening made in body 348 to form the "down" valve 160.

Figure 12:
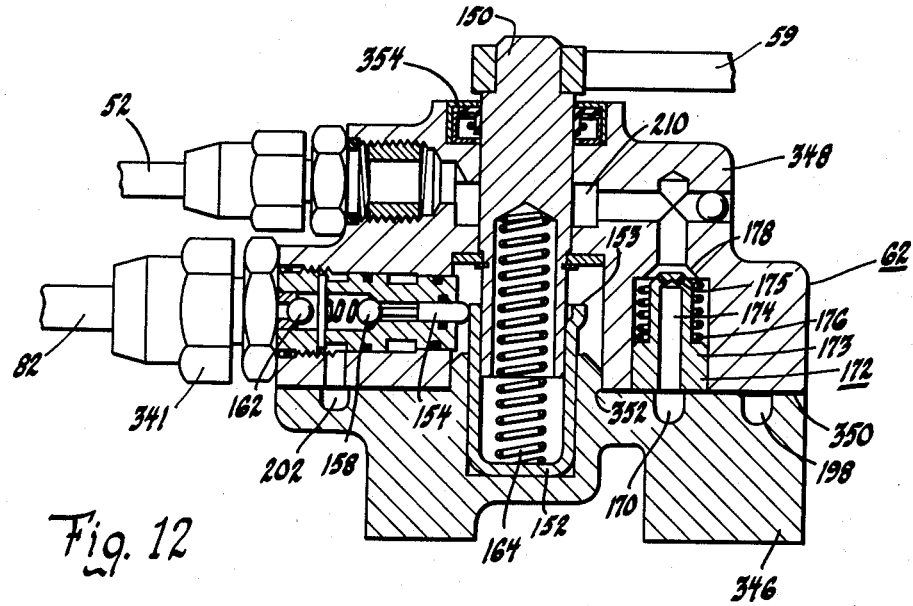
Fig. 12 is a partially sectioned view taken along line 12—12 of Fig. 8.
Figure 11:
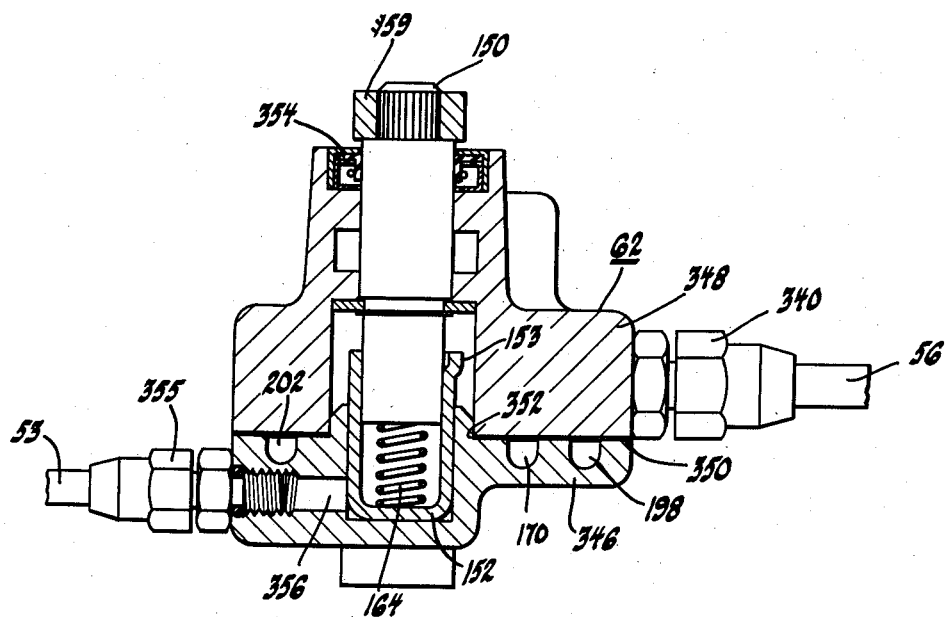
Fig. 11 is a partially sectioned view taken along line 11—11 of Fig. 9.

Figs. 11 and 12 show further detail of the valve means 62 specifically showing connection of a head portion 346 to a body portion 348. A gasket, generally indicated by the numeral 350, is fitted in sealing engagement between the head and body portions 346 and 348, respectively.

Figure 13:
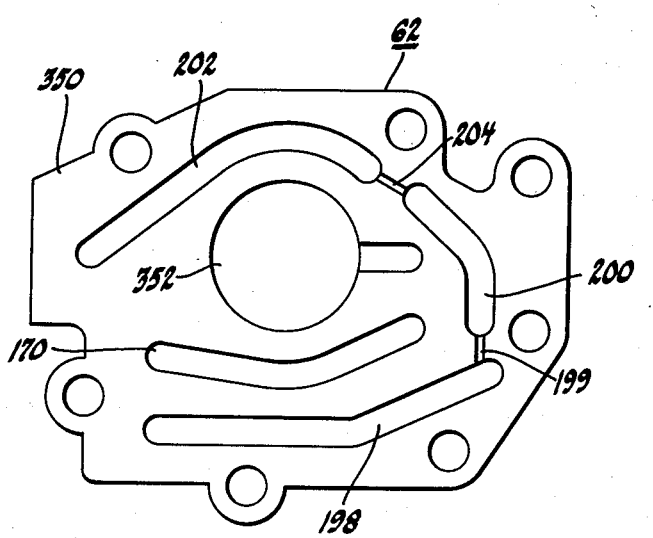
Fig. 13 is a sectional view taken along line 13—13 of Fig. 9.

Fig. 13 shows a plan view of the gasket 350 providing conduit connections between various elements as described with the diagram of Fig. 2 and specifically includes slits or restricted portions 199 and 204 serving the purpose described above in the system. A central opening 352 is provided in the gasket through which the cam member 152 and a portion of the head 346 may be fitted as shown in Figs. 11 and 12. Providing the slits in the gasket as restrictive passages 199 and 204 is advantageous in that such a component for the valving means 62 in the present hydraulic supply system may be economically produced on a mass production basis. A sealing means 354 is disposed between the shaft 150 and body 348 as shown in Figs. 11 and 12. A fitting 355 connects the conduit 53 from the rear transmission pump 54 with a chamber 356 adjacent one end of cam member 152 opposite spring 164.

Figure 14:
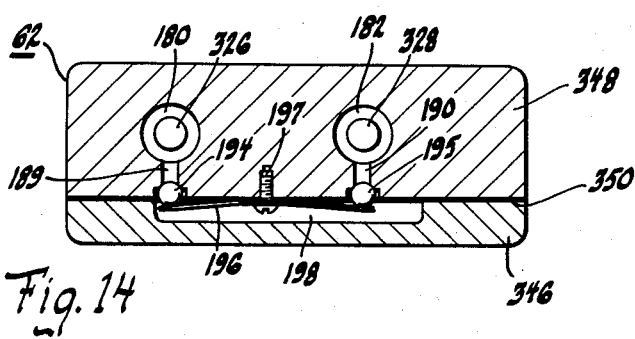
Fig. 14 is a partially sectioned view taken along line 14—14 of Fig. 8.

Fig. 14 shows the head portion 346 and body portion 348 together with the gasket 350 in conjunction with the valves 194 and 195 described with the diagram of Fig. 2. The spring member 196 biases balls forming the valves into corresponding seats formed with the body portion 348 as shown.

Figure 15:
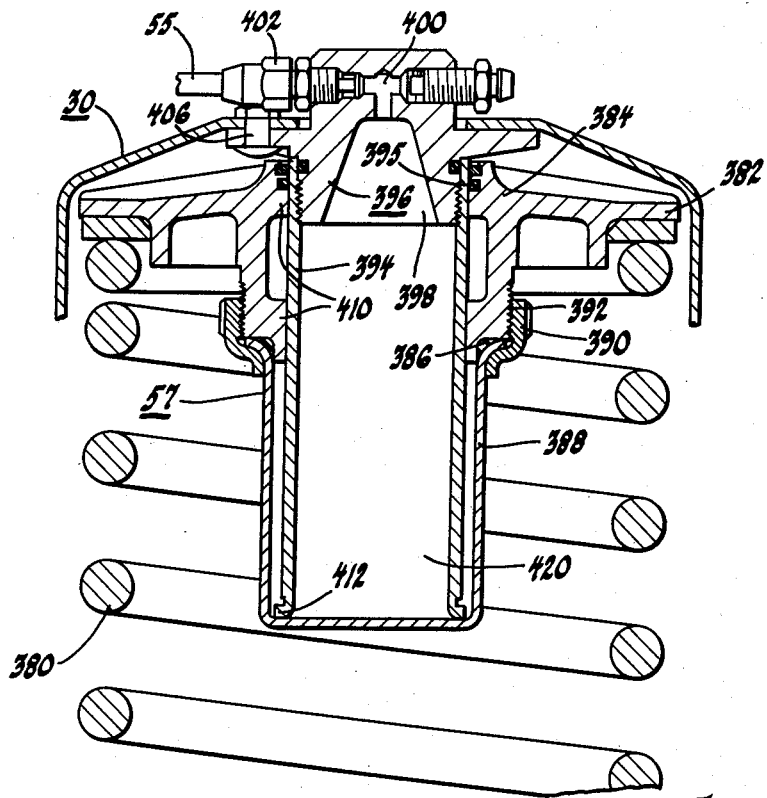
Fig. 15 is a cross-sectional elevational view of an expansible fluid cylinder assembly and spring forming a portion of the suspension mechanism shown in Figs. 1 and 2.

Fig. 15 shows a cross-sectional elevational view of an expansible fluid spring, such as springs 57 and 58 illustrated in Figs. 1 and 2 with the present invention. The springs include a conventional or standard coil spring 380 engageable with a flange 382 formed extending radially outwardly on an annular member 384. The annular member 384 is fitted in sealing engagement by a O-ring seal 386 to a cup-shaped element 388 by means of a coupling ring 390 attached by threads 392 to the annular member 384. The cup-shaped member cooperates with an inner cylinder 394 threadedly attached to a head portion or fitting, generally indicated by the numeral 396, provided with a central recess 398 communicating through a passage 400 with openings through a fitting 402 with a conduit such as 55 or 56 illustrated with Figs. 1 and 2. The head portion 396 is firmly attached by suitable fastening means or bolts 406 to a vehicle sprung mass or car frame 30. The inner cylinder 394 is slidably engageable with the annular member 384 along land portions 410 formed extending radially inwardly with the annular member 384. These lands assure alignment between the relatively slidable portions. The inner cylinder is formed with an outwardly extending flange 412 engageable by one of the annular lands 410 to limit expansible movement between the cylinder 394 and annular member 384. An O-ring seal 395 prevents fluid leakage between the annular member 384 and cylinder 394. The relative vertical distance or clearance height between the sprung and unsprung masses is adjusted by positioning of the radially outwardly extending annular flange 384 by increasing or decreasing the amount of fluid present within a chamber 420 formed by the inner cylinder 394 and cup-shaped element 388. Depending upon the positioning of the annular flange 382 the coil spring 380 will be adjusted in its relative height position between the sprung and unsprung masses to resiliently support the sprung mass on the unsprung mass of the vehicle.

While the embodiment of the present invention as herein disclosed constitutes a preferred form, it is to be understood that other forms might be adopted.

What is claimed is as follows:

1. A control system for regulation of the supply and exhaust of operating fluid to and from both a steering mechanism and also an expansible fluid spring for a motor vehicle to maintain a predetermined clearance height between a sprung mass and an unsprung mass of the vehicle comprising, a power steering mechanism including a source of hydraulic fluid, an expansible fluid spring supporting a sprung mass upon an unsprung mass, first valve means connectable to the source with said steering mechanism to control power-steering-operating flow of fluid, second valve means connectable to the source with said fluid spring to control fluid flow to and from said spring determining clearance height between the sprung and unsprung masses, a first control means sensitive to fluid flow connected between said first and second valve means to cut off temporarily the flow of fluid to said steering mechanism during the time the sprung and unsprung masses are being adjusted in clearance height therebetween, and a second control means sensitive to fluid flow operatively associated with said second valve means to provide for an initial fluid flow through said first control means to close off power steering operating fluid flow in said first valve means at the time when adjustment to clearance height is made thereby divorcing power steering operation from the system temporarily.

2. A control system for regulation of the supply and exhaust of operating fluid to and from both a steering mechanism and also an expansible fluid spring for a motor vehicle to maintain a predetermined clearance height between a sprung mass and an unsprung mass of the vehicle, comprising, a power steering mechanism including a source of hydraulic fluid, an expansible fluid spring supporting a sprung mass upon an unsprung mass, first valve means connectable to the source with said steering mechanism to control power steering operating flow of fluid, second valve means connectable to the source with said fluid spring to control fluid flow to and from said spring determining clearance height between the sprung and unsprung masses, a first control means sensitive to fluid flow connected between said first and second valve means to cut off temporarily the flow of fluid to said steering mechanism during the time the sprung and unsprung masses are being adjusted in clearance height therebetween, a second control means sensitive to fluid flow operatively associated with said second valve means to provide for an initial fluid flow through said first control means to close off power steering operating fluid flow in said first valve means at the time when adjustment to clearance height is made thereby to divorce power steering operation from the system temporarily and conduit means connected between said second valve means and said first control means channeling clearance height correcting flow to said fluid spring until the predetermined relationship between the sprung and unsprung masses is attained to stop flow of fluid with the result that said first control means operatively reconnects said power steering mechanism with the fluid source.

3. A control system for regulation of the supply and exhaust of operating fluid to and from both a steering mechanism and also an expansible fluid spring for a motor vehicle to maintain a predetermined clearance height between a sprung mass and unsprung mass of the vehicle, comprising, a power steering mechanism including a source of hydraulic fluid, an expansible fluid spring supporting a sprung mass upon an unsprung mass, first valve means connectable to the source with said steering mechanism to control power-steering operating flow of fluid, a second valve means connectable to the source with said fluid spring to control fluid flow to and from said spring determining clearance height between the sprung and unsprung masses, control means sensitive to fluid flow connected between said first and second valve means to cut off temporarily the flow of fluid to said steering mechanism during the time the sprung and unsprung masses are being adjusted in clearance height therebetween, and means operative whenever the vehicle is in motion connected to said second valve means inactivating said second valve means to assure fluid flow for power steering mechanism operation except at vehicle standstill.

4. A hydraulic pressure supply system for both a steering mechanism and also an expansible fluid spring for a motor vehicle to maintain a predetermined clearance height between a sprung mass and an unsprung mass of the vehicle, comprising, a power steering machnism including a pump supplying a fluid under pressure, a power steering flow control valve operatively associated with said mechanism to regulate fluid flow from said pump thereto, a pair of expansible fluid springs supporting a sprung mass upon an unsprung mass, a valving member connected between said springs by passages that can be opened or closed to supply or exhaust height determining fluid to said springs, and control means sensitive to fluid flow at vehicle standstill connected between said power steering flow control valve and said valving member operative to temporarily cut off fluid flow to said power steering mechanism during clearance height adjusting fluid flow with said springs, said valving member having a restricted passage between supply and exhaust openings with said springs to limit flow from said pump through said flow sensitive control means to a flow insufficient to effect actuation in opposition to exhaust of fluid from the springs when clearance height exceeds predetermined height between the sprung and unsprung masses.

5. A hydraulic pressure supply system for both a power steering mechanism and also an expansible fluid spring for a motor vehicle to maintain a predetermined clearance height between a sprung mass and an unsprung mass of the vehicle, comprising, a power steering mechanism including a pump supplying fluid under pressure, a power steering flow control valve operatively associated with said mechanism to regulate fluid flow from said pump thereto, a pair of expansible fluid springs supporting a sprung mass upon a unsprung mass, a valving member connected between said springs by passages that can be opened or closed to supply or exhaust height-determining fluid to said springs, control means sensitive to fluid flow at vehicle standstill connected between said power steering flow control valve and said valving member operative to temporarily cut off fluid flow to said power steering mechanism during clearance height adjusting fluid flow with said springs, and multiple valves operable in the passages of said valving member arranged to prevent inter flow of fluid between said pair of springs on opposite sides of the vehicle.

6. A hydraulic pressure supply system for both a power steering mechanism and also an expansible fluid spring for a motor vehicle to maintain a predetermined clearance height between a sprung mass and an unsprung mass of the vehicle, comprising, a power steering mechanism including a pump supplying fluid under pressure, an expansible fluid spring supporting a sprung mass upon an unsprung mass, a first valve means connectable to said pump to control power steering fluid flow, second valve means connectable to said pump with said fluid spring to control fluid flow to and from said spring determining clearance height between the sprung and unsprung masses, a first control means sensitive to fluid flow connected between said first and second valve means to cut off temporarily the flow of fluid to said steering mechanism during the time the sprung and unsprung masses are being adjusted in clearance height therebetween, a second control means sensitive to fluid flow operatively associated with said second valve means to provide an initial fluid flow through said first control means to close off power steering operating fluid flow in said first valve at the time when adjustment to clearance height is made thereby divorcing power steering operation from the system temporarily, and conduit means including a restricted passage connecting said second control means with said second valve means to provide for release of fluid pressure allowing said second control means to reset to a position permitting reconnection of the power steering mechanism to the system.

7. A hydraulic pressure supply system for both a power steering mechanism and an expansible fluid spring for a motor vehicle to maintain a predetermined clearance height between a sprung mass and an unsprung mass of the vehicle, comprising, a power steering mechanism including a pump supplying fluid under pressure, an expansible fluid spring supporting a sprung mass upon an unsprung mass, a first valve means connectable to said pump to control power steering fluid flow, second valve means connectable to said pump with said fluid spring to control fluid flow to and from said spring determining clearance height between the sprung and unsprung masses, a first control means sensitive to fluid flow connected between said first and second valve means to cut off temporarily the flow of fluid to said steering mechanism during the time the sprung and unsprung masses are being adjusted in clearance height therebetween, a second control means sensitive to fluid flow operatively associated with said second valve means to provide an initial fluid flow through said first control means to close off power steering operating fluid flow in said first valve at the time when adjustment to clearance height is made thereby divorcing power steering operation from the system temporarily, conduit means including a restricted passage connecting said second control means with said second valve means to provide for release of fluid pressure allowing said second control means to reset to a position permitting reconnection of the power steering mechanism to the system, and restrictive means between supply and exhaust openings with said spring to limit flow from said pump through said first flow sensitive control means to a flow insufficient to effect actuation in opposition to exhaust of fluid from said spring when clearance height exceeds predetermined height between the sprung and unsprung masses.

8. The hydraulic pressure supply system of claim 6 wherein said second valve means includes a valve body and cover provided with multiple openings and passages and a gasket means with narrow slots between passages forming the restrictive means and conduit means including a restricted passage.

9. A valve means controlling fluid supply to a suspension mechanism, comprising, a valve body having multiple ports and passages connectable to permit supply of fluid to the suspension mechanism, a cam mechanism rotatably journalled in said body movable to effect opening and closing of supply and exhaust passages to the suspension mechanism a flow sensitive valve spool movably placed within a passage of said body connected by a passage with the supply passage upon opening of a port to admit fluid supply, said spool being shifted to a passage closing position in response to a predetermined rate of fluid flow thereby assuring full fluid pressure supply to the suspension mechanism, and a cover member attached to said body having a passage formed with a restriction interconnecting supply and exhaust passages hindering fluid supply flow when the exhaust passage is open.

10. A valve means controlling fluid supply to a suspension mechanism, comprising, a valve body having multiple ports and passages connectable to permit supply and exhaust of fluid to the suspension mechanism, a cam mechanism rotatably journalled in said body, an actuating arm connected to said cam mechanism pivotally movable in response to changes of clearance height between a sprung mass and an unsprung mass of a vehicle to effect opening and closing of supply and exhaust passages to the suspension mechanism, a flow sensitive valve spool movably placed within a passage of said body connected by a passage with the supply passage upon opening of a port to admit fluid supply, said spool being shifted to a passage closing position in response to a predetermined rate of fluid flow thereby assuring full fluid pressure supply to the suspension mechanism, a cover member attached to said body having passages formed therein complimentary to the passages in said body, and a gasket fitted between said body and said cover formed with slots, a pair of the slots having restricted openings therebetween of which one restricted opening releases fluid pressure permitting said flow sensitive valve spool to reset to a position permitting flow therethrough and a second restricted opening is provided hindering fluid flow between supply and exhaust passages when the exhaust passage is open thereby assuring decrease of clearance height maintained by the suspension mechanism between the sprung and unsprung mass of the vehicle.

11. A valve means controlling fluid supply to a suspension mechanism, comprising, a valve body having multiple ports and passages connectable to permit supply and exhaust of fluid to the suspension mechanism, a cam mechanism including an axially shiftable cam member unrotatably journalled in said body, said cam member being shifted to an inoperable position for opening and closing of exhaust and supply ports and passages in response to rearward or forward vehicle motion, a flow sensitive valve spool movably placed within a passage of said body connected by a passage with the supply passage upon opening of a port to admit fluid supply, said spool being shifted to a passage closing position in response to a predetermined rate of fluid flow thereby assuring full fluid pressure supply to the suspension mechanism, and a cover member attached to said body having a passage formed with a restriction interconnecting supply and exhaust passages hindering fluid supply flow at vehicle standstill when the exhaust passage is open assuring decrease of clearance height maintained by the suspension mechanism between a sprung and unsprung mass of a vehicle.

12. In combination with a power steering flow control valve, comprising, a valve body having a recess chamber communicating at one end through a restricted passage with a pump discharge chamber and communicating through an opposite end through another restricted passage with a relief chamber for exhausting excessive pressure from the pump discharge chamber, a valve spool movable in the relief chamber of said body to open and close relief flow of fluid under pressure, said body having conduits formed therein connectable with the recess chamber and a power steering mechanism and another fluid actuated mechanism, and a flow sensitive control means connected in the conduits to cut off fluid flow to the power steering mechanism temporarily diverting full fluid pressure to the other fluid actuated mechanism.

13. The combination with a power steering flow control valve, comprising, a valve body having a recess chamber communicating at one end through a restricted passage with a pump discharge chamber and communicating through an opposite end through another restricted passage with a relief chamber for exhausting excessive pressure from the pump discharge chamber, a valve spool movable in the relief chamber of said body to open and close relief flow of fluid under pressure, said body having conduits formed therein connectable with the recess chamber and a power steering mechanism and an expansible fluid spring suspension mechanism, and a valve means shiftable to divert flow of fluid exclusively to the power steering away from the suspension mechanism in response to a rate of fluid flow therethrough.

14. A fluid circuit on a vehicle, comprising, a power steering pump supplying a fluid under pressure to a discharge chamber, a reservoir connected by a passage with said pump, a power steering flow control valve connected to the discharge chamber to provide fluid pressure relief discharge to said reservoir upon excess fluid discharge from said pump, a power steering mechanism normally connected in series with said flow control valve and said reservoir, a first flow sensitive control means connected at one side by a restricted passage to the pump discharge chamber, an expansible fluid spring suspension mechanism operably connected in series between one side of said flow sensitive control means and said reservoir, a second flow sensitive control means connected in parallel across a supply passage and exhaust passage of said suspension mechanism, and conduit means connected to said flow sensitive means completing a series path from said pump back to said reservoir permitting a pilot flow of fluid through said first fluid sensitive means to shunt off full fluid pressure flow from said power steering mechanism to said suspension mechanism at vehicle standstill by means of said first fluid sensitive means.

15. A hydraulic fluid circuit on a vehicle, comprising, a source of fluid pressure connected with a supply reservoir, a fluid-operable power steering mechanism of the vehicle connectable in series with said source and reservoir, a fluid spring suspension mechanism including spring cylinders mounted between a sprung mass and an unsprung mass of the vehicle, flow control valve means connected between said source and said power steering mechanism, first flow sensitive control means operatively associated with said valve means and said suspension mechanism capable of diverting all fluid flow to said suspension mechanism at vehicle standstill, cam mechanism operable by vertical movement of the sprung mass relative to the unsprung mass to connect supply or exhaust passages with the spring cylinders, ball check valving in series with said first flow sensitive control means and passages associated with said cam mechanism to prevent exhaust of fluid from the cylinders except when the exhaust passages are opened by said cam mechanism, and a second flow sensitive control means movably connected in a passage shunting the exhaust and supply passages with said cam mechanism permitting pilot flow of fluid in series with said first flow sensitive means to divert full flow of fluid to said suspension mechanism and connectable through said ball check valving to the exhaust passage through a restricted orifice to reset said first flow sensitive means connecting full fluid flow to said power steering mechanism away from said suspension mechanism.

References Cited in the file of this patent

UNITED STATES PATENTS

| | | |
|---|---|---|
| 2,363,179 | Harrington | Nov. 21, 1944 |
| 2,391,120 | Berthelman | Dec. 18, 1945 |
| 2,687,311 | Nallinger | Aug. 24, 1954 |
| 2,710,184 | Pemberton | June 7, 1955 |
| 2,737,196 | Eames | Mar. 6, 1956 |
| 2,757,376 | Brueder | July 31, 1956 |